Jan. 29, 1929.
R. F. BACON
1,700,578
PRODUCTION OF HYDROGEN SULPHIDE
Filed May 5, 1927
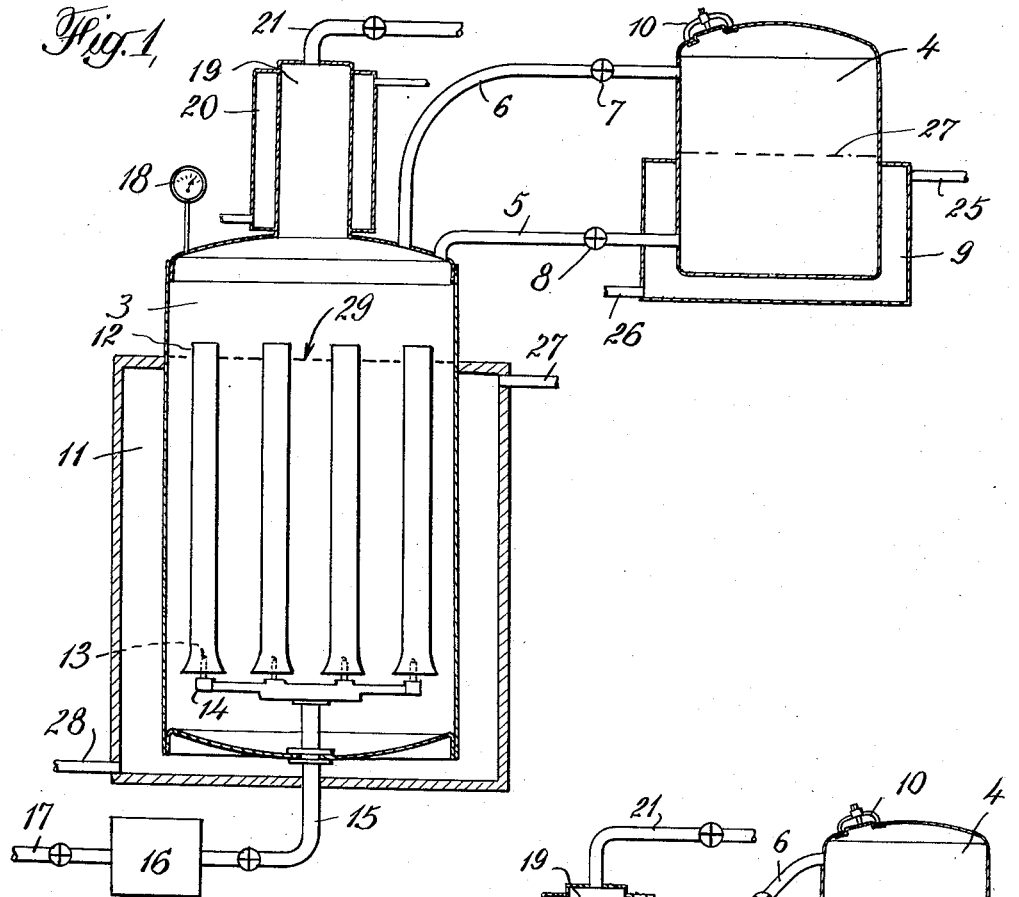
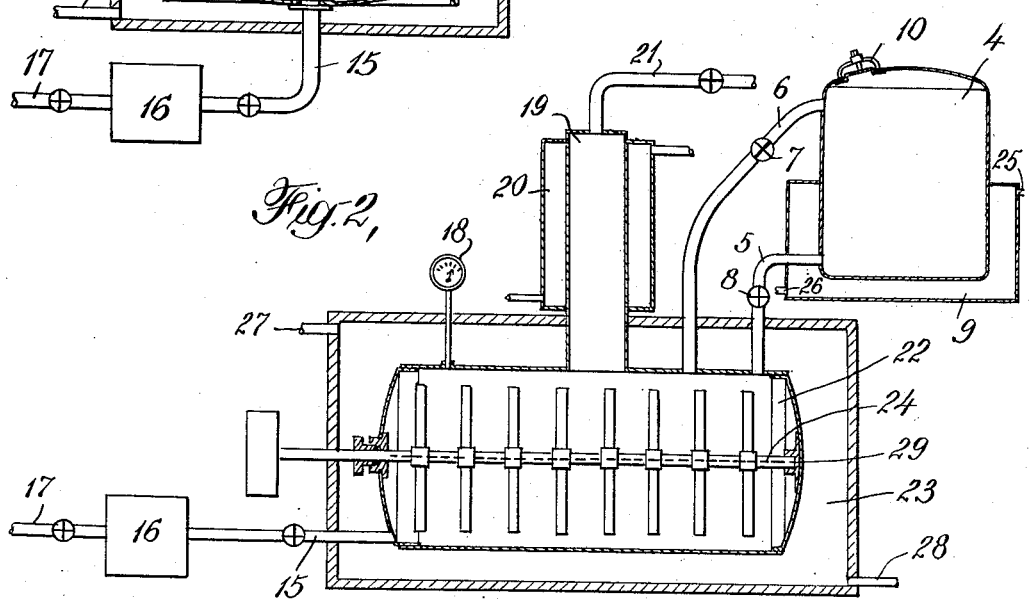
INVENTOR
Raymond F. Bacon
BY
Pennie, Davis, Marvin and Edmonds
HIS ATTORNEYS Patented Jan. 29, 1929.

1,700,578

UNITED STATES PATENT OFFICE.

RAYMOND F. BACON, OF BRONXVILLE, NEW YORK.

PRODUCTION OF HYDROGEN SULPHIDE.

Application filed May 5, 1927. Serial No. 188,902.

This invention relates to the production of hydrogen sulphide by the reaction between liquid sulphur and hydrogen gas, and has for its object the provision of certain improvements in the procedure of carrying on the interaction of hydrogen and sulphur for the production of hydrogen sulphide.

It has long been known that if hydrogen be brought into contact with sulphur at a temperature of substantially 250° to 300° C., hydrogen sulphide will be formed. Theoretically the reaction proceeds in accordance with the following equation:

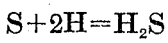
$$S + 2H = H_2S$$

In practice, however, the course of the reaction, under normal conditions, is slow and it is found that when hydrogen is bubbled through liquid sulphur at these temperatures only a small portion of the hydrogen reacts with the sulphur to form hydrogen sulphide and the action is not complete.

If it is desired to use the hydrogen sulphide formed in this way in a subsequent process which contemplates the reaction of the hydrogen sulphide with a gas such, for instance, as sulphur dioxide, it will be found extremely difficult to recover the excess hydrogen which is entrained with the hydrogen sulphide. The difficulty of recovering the unreacted hydrogen will be increased proportionately, provided the sulphur dioxide used is a dilute gas mixed with large volumes of other inert gases. Such a type of gas containing greater or less amounts of sulphur dioxide is the type of reaction gas known as roaster gas, being the gas given off from an ore or similar roasting process in which sulphur or sulphide materials are roasted and the sulphur oxidized to sulphur dioxide. Recovery of the entrained hydrogen in this type reaction is very difficult and the hydrogen is as a consequence lost.

I have discovered that the reaction between hydrogen and sulphur can be made to take place more completely if the reaction is carried out under pressure and at a temperature substantially 250° to 300° C. I have further discovered that an intimate mixture of the reaction hydrogen and the liquid sulphur aids in the completion as well as the rapidity of the reaction. I have further discovered that the most advantageous pressures to use to accelerate and complete the formation of the hydrogen sulphide at these temperatures are from substantially five to substantially ten atmospheres.

The invention is of particular advantage when the gaseous hydrogen which is being used is not a pure hydrogen. Although it is essential to use pressures to speed up the reaction between pure hydrogen and pure sulphur, the invention is particularly advantageous when using one of the commercial gases containing a considerable proportion of hydrogen, such as water gas.

It is important in the practice of my present invention that the gaseous hydrogen or hydrogen containing gas and liquid sulphur be intimately mixed. I have discovered that this thorough mixture of the gas and liquid sulphur may be obtained in a variety of ways, such for instance, as the agitating devices commonly used in the chemical industry or devices partaking of the nature of the metallurgical agitator known as the pachucha tank or agitator.

The essential features of the agitating are the breaking up of the admitted hydrogen so that the contacting surfaces of the hydrogen and sulphur are largely increased and at the same time the lengthening of the period of contact between the sulphur and the small bubbles of hydrogen containing gas.

As a result of my investigations and experiments, I have found that pressure and agitation, effect a very considerable improvement in promoting and accelerating the reaction between hydrogen and sulphur. By thus combining suitable reaction temperatures along with suitable pressures and sufficient agitation, I am able to obtain substantially complete reaction between the hydrogen of a hydrogen containing gas and molten sulphur.

Various forms of apparatus are available for the practice of the invention. In the accompanying drawing I have illustrated two forms of apparatus satisfactory for the purpose. In the drawing:

Fig. 1 is a diagrammatic sectional elevation of an apparatus for carrying out the invention with agitation of the pachucha type under pressure.

Fig. 2 is a diagrammatic sectional elevation of an apparatus for carrying out the invention with mechanical agitation under pressure.

The apparatus illustrated in Fig. 1 comprises a closed reaction chamber 3 adapted to withstand high pressures. The reaction chamber 3 is supplied with molten sulfur from the sulphur melting chamber 4, through a pipe 5. The pressures in the chamber 4 are equalized through pipes 5 and 6 by means of valves 7 and 8.

The sulphur melting chamber 4 is supplied with a jacket 9 by means of which heat is furnished to chamber 4 and a manhole 10 through which supplies of sulphur are charged.

The reaction chamber 3 is furnished with an exterior heating jacket 11 and internally with the tubes 12. At the lower extremities of the tubes 12 are the jets 13 connected through the manifold 14 to the exterior of the chamber 3 by means of the valved pipe 15. The valved pipe 15 connects to the pressure pump 16 and thence through the valved pipe 17 to the source of hydrogen carrying gas not shown.

The upper portion of the chamber 3 is furnished with the pressure gauge 18. A reflux condenser 19 is fitted to the top of the chamber 3 and a cooling jacket 20 surrounds the condenser 19. A valved pipe 21 is fitted to the top of the condenser 19 to convey the finished hydrogen sulphide from the apparatus.

The apparatus illustrated in Fig. 2 comprises a closed reaction chamber 22 adapted to withstand high pressures. The reaction chamber 22 communicates with the sulphur melting chamber 4 through valved pipes 5 and 6 as in Fig. 1, and similarly the chamber 22 connects with the hydrogen source through valved pipes 15 and 17 and the pressure pump 16. The chamber 22 is furnished with a heat supplying jacket 23. As in Fig. 1 the chamber 22 is furnished with a pressure gauge 18, a condenser 19 and a valved exit pipe 21 for the finished hydrogen sulphide.

The chamber 22 is furnished with a mechanical agitator 24 which communicates with the exterior of the chamber 22 through suitable stuffing boxes not shown, and is driven externally from a source not shown.

The operation of the apparatus shown in Fig. 1 will be generally understood from the foregoing description. Sulphur is introduced into the sulphur melting chamber 4 through the manhole 10. Heat is supplied to the chamber 4 by the jacket 9. The heat may come from any suitable source, such as steam. The steam enters the jacket 9 through the pipe 25 and exists through the pipe 26 or vice versa if a liquid substance is used to supply the heat. When the sulphur in chamber 4 is melted, valves 7 and 8 are opened and the sulphur flows by gravity into the reaction chamber 3. It is considered advisable to open both of the valves 7 and 8 nearly simultaneously so that the pressure above the level of the melted sulphur 27 will equalize any pressure from below and the sulphur will then flow unhindered through the pipe 5 into the reaction chamber 3.

The sulphur in the reaction chamber 3 is maintained in a molten condition by the heating jacket 11. The heat for the heating jacket 11 may come from any suitable source, such as steam or heated liquids entering and exiting through the pipes 27 and 28, as may seem most advantageous. The sulphur level 29 in the chamber 3 is maintained just below the upper extremities of the tubes 12 which are suitably supported within the chamber 3.

The lower extremities of the tubes 12 are furnished with jets 13 through which hydrogen or hydrogen containing gas is forced. The lower specific gravity of the sulphur and gas mixture in the tubes 12 will cause a circulation of the sulphur upwards through the tubes 12 and consequently downward in the rest of the body of sulphur in the reaction chamber 3. The jets 13 are connected through a manifold 14 and the valved pipe 15 to the exterior of the reaction chamber 3 and thence to the pressure pump 16. The pressure pump 16 is in turn connected through a valved pipe 17 to the source of hydrogen which is not shown. The construction and capacity of the pump 16 are such that the pump 16 will maintain the desired pressure of from 5 to 10 atmospheres within the reaction chamber 3. While the hydrogen gas is in contact with the molten sulphur in the pachucha tubes 12 and in the rest of the reaction chamber 3, at pressures of from 5 to 10 atmospheres, the hydrogen reacts with the sulphur to form hydrogen sulphide.

The hydrogen sulphide thus formed frees itself from the sulphur and rises, filling the open space in the reaction chamber 3 above the surface of the liquid sulphur. Any unreacted-on gases of course mingle with the hydrogen sulphide and exist from the reaction chamber 3 with the hydrogen sulphide. The rising gases on their way out, pass through the reflux condenser 19 where the gases contact with the artificially cooled walls of the condenser. The cooling is supplied by the cooling jacket 20 which is appropriately supplied with a suitable supply of a cooling agent such, for instance, as water. The cooling action in the condenser causes most of the condensable material in the gases to congeal and fall back into the molten sulphur. Thus, volatilized sulphur is prohibited from being entrained with the outflowing hydrogen sulphide. The thus cleaned hydrogen sulphide passes out through the valved pipe 21 to storage or other processing, not shown.

The upper portion of the reaction chamber 3 is provided with a pressure gauge 18 which indicates at all times the pressure within the reaction chamber 3.

The apparatus illustrated in Fig. 2 operates in all essentials similarly to the apparatus illustrated in Fig. 1 except that the pachucha agitation is replaced by the mechanical agitator 24. It has been found advantageous to maintain the liquid level 29 at substantially the center of the reaction chamber 22. The rate of agitation is determined by the volume of the incoming gases and the composition of the exiting gases.

In the practice of the present invention, the pressures within the reaction chamber may be maintained in any desirable manner, but it has been found most advantageous to maintain this pressure by regulating the supply of hydrogen bearing gas from the pressure pump supplied for this purpose.

Although the heating of both the sulphur melting chamber and the reaction chamber is shown in the two figures of the drawing as being steam or liquid heated, this heating may be carried out in any desired manner, as, for instance, both heating jackets may be replaced by chambers of combustion furnaces or by electrical heating units.

The shape or form of any of the units may be changed to suit local conditions without in any way departing from the spirit of the invention, and I do not wish to confine myself to particular type of apparatus illustrated, the essential features being that the reaction between hydrogen and sulphur should take place at a temperature of substantially 250° to 300° C. and under a pressure of substantially 5 to 10 atmospheres with appropriate agitation.

I claim:

1. The improvement in the production of hydrogen sulphide by the reaction between molten sulphur and hydrogen, characterized by subjecting the reacting molten sulphur and the hydrogen gas to pressure to substantially promote the reaction between the molten sulphur and the hydrogen gas with the formation of hydrogen sulphide.

2. The improvement in the production of hydrogen sulphide by the reaction between molten sulphur and hydrogen gas, characterized by subjecting the reacting molten sulphur and the hydrogen gas to agitation to substantially promote the reaction between the molten sulfur and the hydrogen gas with the formation of hydrogen sulphide.

3. The improvement in the production of hydrogen sulphide by the reaction between molten sulphur at a temperature of from 250° to 300° C. and hydrogen gas, characterized by subjecting the reacting molten sulphur and the hydrogen gas to agitation and pressure to substantially promote the reaction between the molten sulphur and the hydrogen gas with the formation of hydrogen sulphide.

4. The improvement in the production of hydrogen sulphide by the reaction between molten sulphur and gaseous hydrogen which comprises, subjecting the reacting molten sulphur and the gaseous hydrogen to a pressure of five to ten atmospheres.

5. The improvement in the production of hydrogen sulphide by the reaction between molten sulphur and gaseous hydrogen which comprises, subjecting the reacting molten sulphur and the gaseous hydrogen to thorough agitation.

6. The improvement in the production of hydrogen sulphide by the reaction between molten sulphur and gaseous hydrogen which comprises, subjecting the reacting molten sulphur and the gaseous hydrogen to thorough agitation and a pressure of five to ten atmospheres.

7. The improvement in the production of hydrogen sulphide by the reaction between molten sulphur and gaseous hydrogen which comprises, subjecting the reacting molten sulphur and the gaseous hydrogen to thorough agitation and a pressure of five to ten atmospheres and removing impurities from the formed hydrogen sulphide.

8. The improvement in the production of hydrogen sulphide by the reaction between molten sulphur and gaseous hydrogen which comprises, subjecting the reacting molten sulphur and the gaseous hydrogen to thorough agitation and a pressure of five to ten atmospheres and removing by condensation impurities from the formed hydrogen sulphide.

9. The improvement in the production of hydrogen sulphide by the reaction between molten sulphur and gaseous hydrogen which comprises, subjecting the reacting molten sulphur to agitation by means of the reacting hydrogen.

10. The improvement in the production of hydrogen sulphide by the reaction between molten sulphur and gaseous hydrogen which comprises, subjecting the reacting molten sulphur to agitation by means of the reacting hydrogen at a pressure of five to ten atmospheres.

11. The improvement in the production of hydrogen sulphide by the reaction between molten sulphur and gaseous hydrogen which comprises, subjecting the reacting molten sulphur to agitation by means of the reacting hydrogen at a pressure of five to ten atmospheres and removing by condensation impurities from the formed hydrogen sulphide.

In testimony whereof I affix my signature.

RAYMOND F. BACON.